United States Patent
Miller, Jr. et al.

(10) Patent No.: US 10,529,995 B2
(45) Date of Patent: Jan. 7, 2020

(54) REUSABLE RESETTABLE RETRIGGERABLE REBUILDABLE SQUIBLESS MISSILE BATTERY

(71) Applicant: Raytheon Company, Waltham, MA (US)

(72) Inventors: Joseph Brent Miller, Jr., Tucson, AZ (US); Timothy A. Murphy, Tucson, AZ (US); Donald J. Golding, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 47 days.

(21) Appl. No.: 14/856,989

(22) Filed: Sep. 17, 2015

(65) Prior Publication Data

US 2017/0084889 A1    Mar. 23, 2017

(51) Int. Cl.
| | |
|---|---|
| *H01M 6/42* | (2006.01) |
| *H01M 2/10* | (2006.01) |
| *H01M 6/50* | (2006.01) |
| *F42B 15/00* | (2006.01) |

(52) U.S. Cl.
CPC ............... *H01M 6/42* (2013.01); *F42B 15/00* (2013.01); *H01M 2/1077* (2013.01); *H01M 6/5011* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 3,284,242 | A | 11/1966 | Schilke |
| 3,500,060 | A | 3/1970 | Cook |
| 4,418,127 | A | 11/1983 | Shambaugh et al. |
| 4,528,253 | A | 7/1985 | McManis, III et al. |
| 5,542,334 | A | 8/1996 | Wells |
| 6,439,097 | B1 | 8/2002 | Loving |
| 6,943,555 | B2 | 9/2005 | Dick et al. |
| 7,462,424 | B2 | 12/2008 | Munshi |
| 2003/0211383 | A1 | 11/2003 | Munshi et al. |

(Continued)

FOREIGN PATENT DOCUMENTS

| | | | | |
|---|---|---|---|---|
| KR | 2002-0093537 | * | 12/2002 | ............... H01M 6/12 |
| WO | WO 99-29259 | | 6/1999 | |

*Primary Examiner* — Ula C Ruddock
*Assistant Examiner* — Tony S Chuo

(57) ABSTRACT

A receptacle in the body of a missile includes a plurality of electrical contacts connected to one or more electrically powered devices within the missile and configured to connect to an electrical power source. The receptacle receives a removable and reusable battery pack including connectors contacting the plurality of electrical contacts when the battery pack is mounted within the receptacle and one or more non-chemical, squibless batteries, preferably comprised of high power density primary cell lithium metal oxide cells. An interface circuit coupled to the squibless batteries initiates, terminates, and re-initiates delivery of electrical power from the squibless batteries to the plurality of electrical contacts based on a control input. Transportation, storage, and use risks associated with squibs in chemical batteries are avoided. During development testing, battery power may be shut down and restarted without the battery first becoming fully depleted and replaced shortening overall testing time and reducing expense.

20 Claims, 2 Drawing Sheets

(56) References Cited

U.S. PATENT DOCUMENTS

2007/0184339 A1\* 8/2007 Scheucher .......... H01M 2/1077
429/99
2013/0256464 A1\* 10/2013 Belik .................... B64C 35/008
244/4 R \* cited by examiner

REUSABLE RESETTABLE RETRIGGERABLE REBUILDABLE SQUIBLESS MISSILE BATTERY

TECHNICAL FIELD

The present disclosure is directed in general to reusable flight batteries for airborne missiles or vehicles and, more particularly, to use of such batteries within weapons during testing and fielding.

BACKGROUND OF THE DISCLOSURE

Small tactical weapons dropped or fired from helicopters or fixed-wing aircraft may use rockets for propulsion, but still require electrical power for navigation (rudder and elevator) and other internal control systems, target tracking systems, wireless communications, and global positioning system (GPS) data acquisition. Similarly UAVs may employ a liquid fuel for the propulsion system but still require electrical power for other systems. Such aircraft typically employ a flight battery for electrical power. Cost-effective testing of such aircraft during development requires that the flight battery be reusable.

SUMMARY OF THE DISCLOSURE

A receptacle in the body of a missile includes a plurality of electrical contacts connected to one or more electrically powered devices within the missile and configured to connect to an electrical power source. The receptacle receives a removable and reusable battery pack including connectors contacting the plurality of electrical contacts when the battery pack is mounted within the receptacle and one or more non-chemical, squibless batteries, preferably comprised of high power density primary cell lithium metal oxide cells. An interface circuit coupled to the squibless batteries initiates, terminates, and re-initiates delivery of electrical power from the squibless batteries to the plurality of electrical contacts based on a control input. Transportation, storage, and use risks associated with squibs in chemical batteries are avoided. During development testing, battery power may be shut down and restarted without the battery becoming fully depleted and replaced shortening overall testing time and reducing expense.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
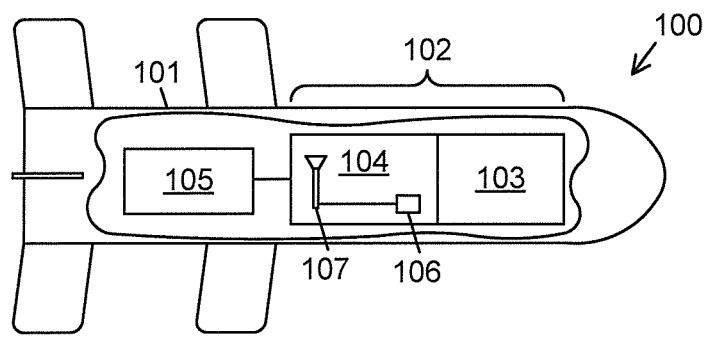
FIG. 1 illustrates an aerial system including a reusable, resettable squibless battery in accordance with embodiments of the present disclosure.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale.

Many development programs for airborne missiles or jet-powered vehicles require testing with a whole system operating without external power to understand and characterize how the critical components work as a system. During either of integration and testing of a new product or demonstration and testing of upgrades to an existing product, at some point performance under actual use conditions must be determined. Flight batteries for airborne missiles are often powered by a chemical reaction that is triggered by firing of a squib (small explosive charge), and generally must be allowed to completely exhaust chemical reactants before the battery can be either replaced or refurbished. Squibbed batteries are typically a long lead-time product that cannot be quickly refurbished.

Squibbed batteries are also difficult to acquire for all capacities needed for a range of development programs. For example, squibbed batteries do not generally output variable voltage levels to accommodate all of the different voltage levels required by circuits inside the respective control (e.g., guidance, communications, navigation) packages of a range of systems. One system might require a 20 volt (V) output while another may require no more than 8 V, such that different battery designs or models are required for the two different systems. Still further, if a problem arises when on-board batteries must be squibbed for test and integration, there is no way to shut down the power and keep electronics from becoming overheated or stressed, possibly destroying the unit used for testing. Currently, with the use of regular flight batteries having built-in squibs, the battery fires and must be allowed to run out.

FIG. 1 illustrates an aerial system including a reusable, resettable squibless battery in accordance with embodiments of the present disclosure. An aerial system 100, illustrated as a missile in the embodiment of FIG. 1, includes a body 101 forming a housing containing portions of the aerial system including a propulsion subsystem, mechanical or electromechanical controls, and the like. A portion of the body 101 is shown as cutaway in FIG. 1 to illustrate, in block diagram form, components within the body 101 relating to the reusable, resettable squibless battery of the present disclosure. Mounted within the body 101 is a battery pack 102 formed by a set of squibless batteries 103 and an interface circuit 104. The battery pack 102 shown may be one of a plurality of battery packs mounted within the body 101. Each battery pack 102 is accessible from an exterior of the body 101 through, for example, a removable access panel or the like. Each battery pack 102, or at least the set of squibless batteries 103, is contained within a discrete physical housing with appropriate electrical connectors and is therefore itself removable and replaceable, allowing the battery pack 102 or the set of squibless batteries 103 to be physically removed from the interior of the body 101 and replaced with a comparable battery pack 102 or set of squibless batteries 103. Thus, during development, the battery pack 102 or set of squibless batteries 103 may be readily removed and replaced to facilitate testing or repeated testing of various functional elements within aerial system 100, reducing the time required for the testing or repeated testing.

The battery pack(s) 102 supply power through the interface circuitry 104 to devices and systems 105 within the body 101 requiring electrical power. To facilitate both reuse and replacement of the battery pack(s) 102, a control 106 is included within the interface circuitry 104 for shutting down the battery power to the on-board devices/systems 105. The control 106 might be a physical control such as a physical switch accessible from the exterior of the body 101, but is preferably an electronic control that may be actuated either by an on-board computer within the aerial system 100 or by an external (e.g., wireless) control system communicating via antenna 107. This control 106 allows a reset signal to be sent by the on-board computer or external control to shut down the battery power to the devices/systems 105, allowing for reset or restoration and retesting of the devices/systems 105 until the battery pack 102 ultimately runs out of energy. This can further shorten the duration of testing and repeated testing typically required in missile development programs, beyond the time reduction achieved using a removable and replaceable battery pack as described above.

Figure 1A:
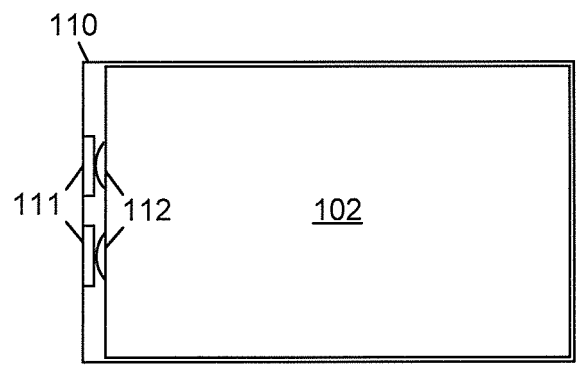
FIGS. 1A and 1B each depict in greater detail selected portions of the structure of FIG. 1 in accordance with embodiments of the present disclosure.

FIG. 1A depicts in greater detail selected portions of the missile 100 illustrated of FIG. 1 in accordance with one embodiment of the present disclosure. The housing 101 contains a battery pack receptacle 110 within which the replaceable battery pack 102 may be inserted. A plurality of electrical contacts 111 within the receptacle 110 connect to the devices/systems 105 and are configured to connect to an electrical power source—the battery pack 102 in this embodiment. The battery pack 102 is supported within the receptacle 110 and removable from the receptacle 110. In addition to the set of squibless batteries 103 and the interface circuitry 104, the battery pack 102 also includes connectors 112 contacting the plurality of electrical contacts 111 within the receptacle 110 when the battery pack 102 is mounted within the receptacle 110. Electrical power from squibless batteries within the battery pack 102 is transmitted through the connectors 112 and electrical contacts 111 to the electrically-powered devices/systems 105.

Figure 1B:
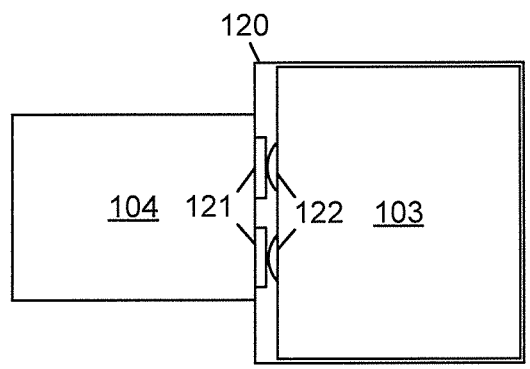

FIG. 1B depicts in greater detail selected portions of the missile 100 illustrated of FIG. 1 in accordance with an alternative embodiment of the present disclosure. In this embodiment, the housing 101 contains a battery pack receptacle 120 within which a replaceable battery pack containing the set of squibless batteries 103 (but not instances of the interface circuit 104) may be inserted. In this embodiment, the interface circuit 104 remains within the housing 101. A comparable plurality of electrical contacts 121 within the receptacle 120 connect to the interface circuit 104 (which is in turn electrically connected to the devices/systems 105). The set of squibless batteries 103 is supported within the receptacle 120 and removable from the receptacle 120. The housing for the set of squibless batteries 103 includes connectors 122 contacting the plurality of electrical contacts 121 within the receptacle 120 when the set of squibless batteries 103 is mounted within the receptacle 120.

Figure 2:
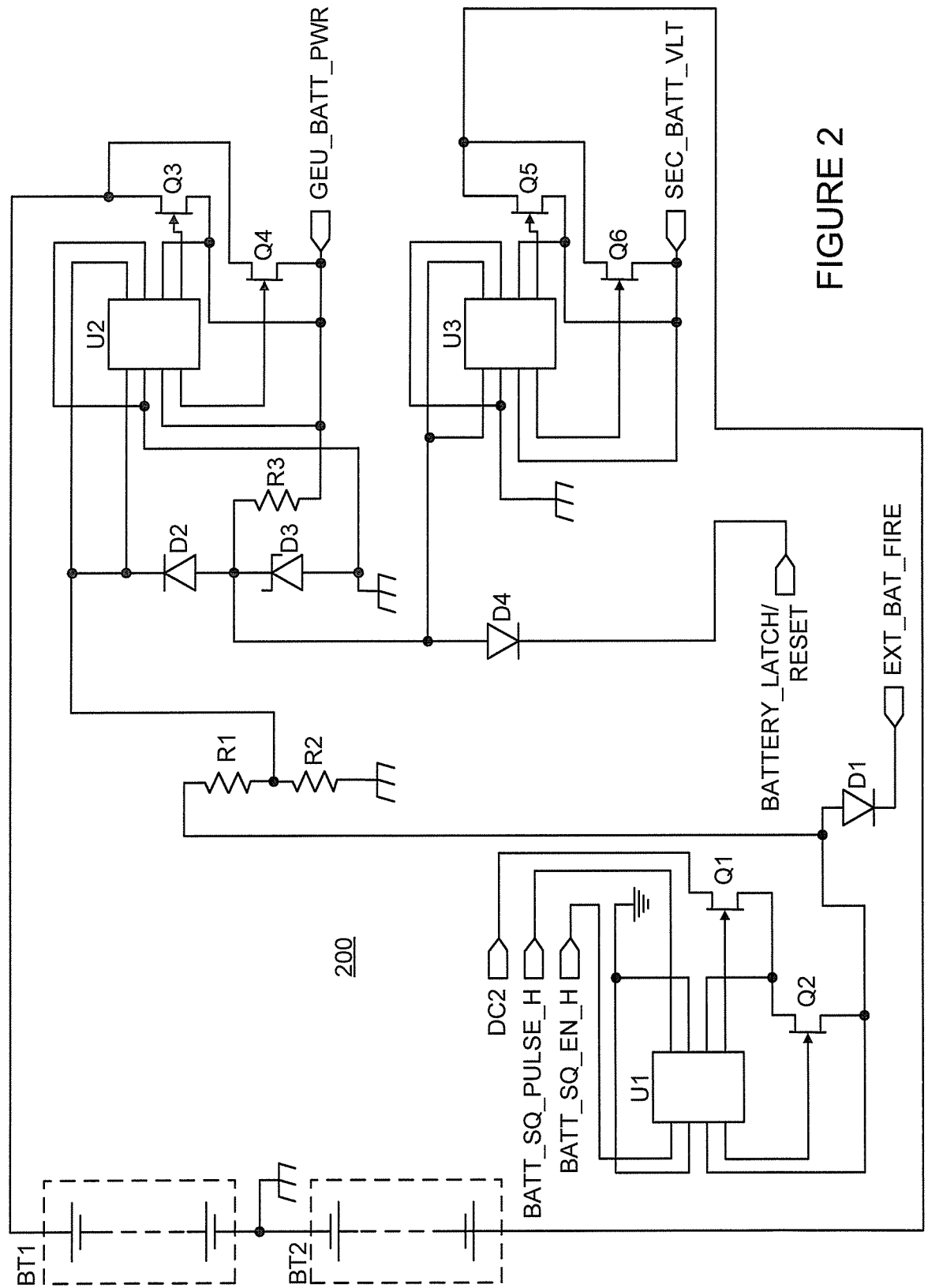
FIG. 2 is a circuit diagram for an instance of interface circuitry within an aerial system including a reusable, resettable squibless battery in accordance with embodiments of the present disclosure.

FIG. 2 is a circuit diagram for an instance of interface circuitry within an aerial system including a reusable, resettable squibless battery in accordance with embodiments of the present disclosure. Circuit 200 is one instance of a portion of the interface circuitry 104, and may be one of multiple instances of that circuit within the interface circuitry 104, each connected to a plurality of batteries as described below and all connected to generate the power required for operation of the devices/systems 105 within the aerial system 100. Battery set BT1 depicted in FIG. 2 is a set of series-connected primary cell lithium metal oxide cells (e.g., commercially available size AA batteries) that form the primary (GEU) battery. Such batteries were not previously considered for use in aerial vehicles in lieu of chemical batteries because there existed no expectation that sufficient power output could be achieved with an acceptable weight or shelf life. Battery set BT2 is likewise a set of series-connected lithium metal oxide cells that form the secondary battery. Battery sets BT1 and BT2 are each connected at a negative terminal for the series to a chassis ground.

Four inputs control operation of the circuit 200: BATT_SQ_EN_H, BATT_SQ_PULSE_H, DC2, and BATTERY_LATCH/RESET. The input BATT_SQ_EN_H is connected to the logic input for a first metal oxide semiconductor field effect transistor (MOSFET) driver within a dual-driver circuit U1. The positive output for that first driver within the dual-driver circuit U1 is connected to the gate terminal of an n-channel field effect transistor (N FET) Q2, while the negative output for the first driver within the dual-driver circuit U1 is connected to a first source or drain terminal of the transistor Q2. The input BATT_SQ_PULSE_H is connected to the logic input for a second MOSFET driver within the dual-driver circuit U1. The positive output for that second driver within the dual-driver circuit U1 is connected to the gate terminal of an N FET transistor Q1, while the negative output for the second driver within the dual-driver circuit U1 is connected to both a second source or drain terminal of the transistor Q2 and a first source or drain terminal of the transistor Q1. The clock and ground inputs to the dual-driver circuit U1 are both connected to a digital ground.

The input DC2 of circuit 200 is connected to a second source or drain terminal of the transistor Q1. The second source or drain terminal of the transistor Q2 is further connected to both the anode of a diode D1 and to one end of a voltage divider formed by series-connected resistors R1 and R2, where the other end of the voltage divider is connected to the chassis ground. Each of resistors R1 and R2 may be, for example, a 1 kilo-Ohm (kΩ) resistor. The cathode of diode D1 is connected to an output EXT_BAT_FIRE for the circuit 200.

The input BATTERY_LATCH/RESET of circuit 200 is connected to the cathode of a diode D4. The anode of diode D4 is connected to the anode of a diode D2 and the cathode of a zener diode D3, which may be a 5 volt (V) zener diode. The anode of zener diode D3 is connected to the chassis ground. Both logic inputs of a second dual-driver circuit U2 are connected to both the cathode of diode D2 and the connection point between resistors R1 and R2 in the voltage divider. Also connected to the anode of diode D2 and the cathode of a zener diode D3 is one terminal (a first terminal) of a resistor R3 (e.g., a 2.2 KΩ resistor), with the other terminal (the second terminal) of resistor R3 connected to a primary battery power output GEU_BATT_PWR for circuit 200. The positive output for one of the two MOSFET drivers in dual-driver circuit U2 is connected to the gate of an N FET transistor Q4, while the negative output for that MOSFET driver in dual-driver circuit U2 is connected to circuit output GEU_BATT_PWR and the second terminal of resistor R3. One source or drain terminal for transistor Q4 is also connected to the circuit output GEU_BATT_PWR and the second terminal of resistor R3. The positive output for the other of the two MOSFET drivers in dual-driver circuit U2 is connected to the gate of an N FET transistor Q3, while the negative output for that other MOSFET driver in dual-driver circuit U2 is also connected to both the circuit output GEU_BATT_PWR and the second terminal of resistor R3, as well as to one source or drain terminal of transistor Q3. The other source or drain terminal of transistor Q3 and the other source or drain terminal of transistor Q4 are both connected to the positive terminal of the battery set BT1.

The anode of diode D4 is also connected to both logic inputs of a third dual-driver circuit U3. The positive output for one of the two MOSFET drivers in dual-driver circuit U3 is connected to the gate of an N FET transistor Q6, while the negative output for that MOSFET driver in dual-driver circuit U3 is connected to both a circuit output SEC_BAT_VLT and one source or drain terminal for transistor Q6. The positive output for the other of the two MOSFET drivers in dual-driver circuit U3 is connected to the gate of an N FET transistor Q5, while the negative output for that other MOSFET driver in dual-driver circuit U3 is also connected to both the circuit output SEC_BAT_VLT, as well as to one source or drain terminal of transistor Q5. The other source or drain terminal of transistor Q5 and the other source or drain terminal of transistor Q6 are both connected to the positive terminal of the battery set BT2. The clock and ground inputs of both dual-driver circuit U2 and dual-driver circuit U3 are connected to the chassis ground.

In operation, the signal received at circuit input DC2 for circuit 200 controls the voltage output between circuit output GEU_BATT_PWR and circuit output SEC _BAT_VLT to the on-board devices/systems 105, allowing activation of one of (at least) two voltage values. For example, the battery set BT2 may be switched into or out of the power delivery path to alter the voltage output between circuit output GEU_BATT_PWR and circuit output SEC _BAT_VLT. Changes to resistors R1, R2 and R3 may activate either or both of the two selectable voltage values, and routine modifications to the circuit 200 would allow any one of three, four or more selectable voltage values to be output. The input BATTERY_LATCH/RESET of circuit 200 allows the battery to shut down the battery power to the on-board devices/systems 105. The input BATTERY_LATCH/RESET is activated with the delivery of battery power from the battery pack when the battery activates (e.g., digital high), and deactivates the delivery of battery power from the battery pack when the signal is driven to ground (e.g., digital low) on that input. When the battery pack has been activated and deactivated at least once without being depleted of power, the battery pack can be reactivated in the same manner as the original activation until the battery pack is depleted.

The system described facilitates testing of small tactical munitions that are designed to be dropped from an aircraft. The battery design uses commercially available, military qualified, high power density batteries with control circuitry that activates and deactivates (and reactivates) the battery power delivery. MOSFET drivers and MOSFETs are employed with a collapsing hold circuit to turn on and keep on the battery power delivery when powered up, while a feature of the collapsing hold grounds out the triggering signal to, in turn, shut off power delivery from the battery pack. If not shut off, the battery pack will operate until completely depleted. The battery pack can provide many different voltage levels, depending on application, and can be assembled to fit custom form factors.

High power-density primary cell lithium metal oxide cells batteries capable of providing 5 amperes (A) steady state with 15 A surge current at 4 volts (V) per cell with commercially available size AA cells are preferably employed. Advantages of these batteries include ready availability from many vendors and ease of replacement. There are no squib concerns with such batteries, making storage less problematic. The battery pack is capable of being turned off after initiated, which cannot be done with current squibbed batteries used in most weapons. The inputs are digitally controlled, and thus do not require a high current to initiate the battery pack.

The reusable battery pack described provides successful electronic control of battery operation in small tactical weapons and other airborne systems. To handle cold environments, provisions may be included to allow control of heaters inside the battery pack, enabling use of the battery pack in the absence of (sufficient) self-heating or until self-heating alone becomes sufficient.

The reusable battery pack described allows for easy ground testing, cost savings over the lifetime of testing a new design, the ability to reduce component cost for the power control card within a new design, and the ability to exploit multiple voltage taps at different levels for electronics operation. End-to-end testing, including a simulated launch, is possible without the need to disassemble an all up round before flight.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The description in the present application should not be read as implying that any particular element, step, or function is an essential or critical element which must be included in the claim scope: the scope of patented subject matter is defined only by the allowed claims. Moreover, none of these claims are intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

What is claimed is:

1. An aerial vehicle, comprising:
  a housing forming at least a portion of a body of the aerial vehicle;
  a plurality of electrical contacts within the housing and electrically connected to one or more electrically-powered devices within the aerial vehicle;
  one or more squibless battery packs supported within the housing and removable from the housing, each battery pack including:
    connectors electrically connected to the plurality of electrical contacts within the housing when the battery pack is mounted within the housing, and
    one or more squibless batteries; and an interface circuit electrically coupled between the connectors for the one or more squibless batteries and at least one of the one or more electrically-powered devices, the interface circuit including:
first and second dual-input drivers,
a first control input coupled to the first dual-input driver and configured to receive a first control signal for initiating delivery of electrical power to the at least one device,
a second control input coupled to the first dual-input driver and configured to receive a second control signal for terminating the delivery of the electrical power to the at least one device, and
a third control input coupled to the second dual-input driver and configured to receive a third control signal for latching the delivery of the electrical power until reset and for resetting the latching of the delivery of the electrical power.

2. The aerial vehicle according to claim 1, wherein the one or more squibless battery packs are formed by primary cell lithium metal oxide cells.

3. The aerial vehicle according to claim 1, wherein the interface circuit is further configured to switch the delivery of the electrical power from a first voltage to a second voltage based on an output voltage control signal.

4. The aerial vehicle according to claim 3, wherein:
the one or more squibless batteries comprise a first set of batteries and a second set of batteries, and
the delivery of the electrical power at the first voltage employs only one of the first and second sets of batteries while the delivery of the electrical power at the second voltage employs both of the first and second sets of batteries.

5. The aerial vehicle according to claim 1, wherein, when the delivery of the electrical power to the at least one device has been terminated, the interface circuit is configured to reinitiate the delivery of the electrical power to the at least one device in response to the first control signal being applied to the first control input coupled to the first dual-input driver.

6. The aerial vehicle according to claim 1, wherein each battery pack includes the interface circuit.

7. The aerial vehicle according to claim 3, wherein the interface circuit further includes a fourth control input configured to receive the output voltage control signal for selecting one of the first voltage or the second voltage.

8. A method, comprising:
providing, within a housing forming at least a portion of a body of an aerial vehicle, a plurality of electrical contacts electrically connected to one or more electrically-powered devices within the aerial vehicle;
supporting one or more battery packs within the housing in a removable manner, each battery pack including:
connectors electrically connected to the plurality of electrical contacts within the housing when the battery pack is mounted within the housing, and
one or more squibless batteries; and
employing an interface circuit electrically coupled between the connectors for the one or more squibless batteries and at least one of the one or more electrically-powered devices, the interface circuit including:
first and second dual-input drivers,
a first control input coupled to the first dual-input driver and configured to receive a first control signal for initiating delivery of electrical power to the at least one device,
a second control input coupled to the first dual-input driver and configured to receive a second control signal for terminating the delivery of the electrical power to the at least one device, and
a third control input coupled to the second dual-input driver and configured to receive a third control signal for latching the delivery of the electrical power until reset and for resetting the latching of the delivery of the electrical power.

9. The method according to claim 8, wherein the one or more squibless batteries are primary cell lithium metal oxide cells.

10. The method according to claim 8, further comprising:
switching the delivery of the electrical power from a first voltage to a second voltage based on an output voltage control signal received by the interface circuit.

11. The method according to claim 10, wherein:
the one or more squibless batteries comprise a first set of batteries and a second set of batteries, and
the delivery of the electrical power at the first voltage employs only one of the first and second sets of batteries while the delivery of the electrical power at the second voltage employs both of the first and second sets of batteries.

12. The method according to claim 8, further comprising:
following termination of the delivery of the electrical power to the at least one device, reinitiating the delivery of the electrical power to the at least one device in response to the first control signal being applied to the first control input coupled to the first dual-input driver.

13. The method according to claim 8, wherein each battery pack includes the interface circuit.

14. The method according to claim 10, wherein the interface circuit further includes a fourth control input configured to receive the output voltage control signal for selecting one of the first voltage or the second voltage.

15. A battery system, comprising:
a battery pack sized to be supported within a receptacle in a body of an aerial vehicle and configured to be removable from the receptacle, the battery pack including:
connectors configured to be electrically connected to a plurality of electrical contacts within the receptacle that are electrically connected to one or more electrically-powered devices within the aerial vehicle, and
one or more squibless batteries; and
an interface circuit configured to be electrically coupled between the connectors for the one or more squibless batteries and at least one of the one or more electrically-powered devices, the interface circuit including:
first and second dual-input drivers,
a first control input coupled to the first dual-input driver and configured to receive a first control signal for initiating delivery of electrical power to the at least one device,
a second control input coupled to the first dual-input driver and configured to receive a second control signal for terminating the delivery of the electrical power to the at least one device, and
a third control input coupled to the second dual-input driver and configured to receive a third control signal for latching the delivery of the electrical power until reset and for resetting the latching of the delivery of the electrical power.

16. The battery system according to claim 15, wherein the one or more squibless batteries are primary cell lithium metal oxide cells.

17. The battery system according to claim 15, wherein the interface circuit is further configured to switch the delivery of the electrical power from a first voltage to a second voltage based on an output voltage control signal.

18. The battery system according to claim 17, wherein:
the one or more squibless batteries comprise a first set of batteries and a second set of batteries, and
the delivery of the electrical power at the first voltage employs only one of the first and second sets of batteries while the delivery of the electrical power at the second voltage employs both of the first and second sets of batteries.

19. The battery system according to claim 15, wherein, when the delivery of the electrical power has been terminated, the interface circuit is configured to reinitiate the delivery of the electrical power to the at least one device in response to the first control signal being applied to the first control input coupled to the first dual-input driver.

20. The battery system according to claim 15, wherein the battery pack includes the interface circuit.

* * * * *